United States Patent [19]

Eldon et al.

[11] Patent Number: 4,645,155
[45] Date of Patent: Feb. 24, 1987

[54] ARM WITH ADJUSTABLE SWIVEL CONNECTION

[75] Inventors: James B. Eldon, Barto; Kenneth Wnek, Bethlehem, both of Pa.

[73] Assignee: Knoll International, Inc., New York, N.Y.

[21] Appl. No.: 841,209

[22] Filed: Mar. 19, 1986

[51] Int. Cl.⁴ .................................................. E04G 3/00
[52] U.S. Cl. .................................. 248/278; 248/288.5; 403/90
[58] Field of Search ................... 248/278, 284, 288.3, 248/288.5, 181, 180, 183, 371, 279; 108/28, 29, 26, 5; 403/90, 76, 115, 142, 143

[56] References Cited

U.S. PATENT DOCUMENTS

| | | | |
|---|---|---|---|
| 1,318,703 | 10/1919 | Stuchlak | 108/5 |
| 3,211,405 | 10/1965 | Fey et al. | 248/183 |
| 3,519,236 | 7/1970 | Schmidt et al. | 248/181 |
| 4,159,092 | 6/1979 | DeLano | 248/288.5 X |
| 4,562,987 | 1/1986 | Leeds et al. | 248/278 |
| 4,573,655 | 3/1986 | Vulic | 248/278 |

Primary Examiner—Ramon O. Ramirez
Attorney, Agent, or Firm—Thomas A. O'Rourke

[57] ABSTRACT

An arm extends from a support assembly which may be clamped to the edge of a desk and the angle of the arm relative to the support assembly is adjusted by turning a knob.

The outer end of the arm has a swivel connection to a small table or other device. The swivel connection includes a ball and a post extending from the ball. The ball is adjustably clamped between a rim of a hole in the arm and a rim of a hole of an adjustable lever means. The lever means is released and tightened by a knob.

17 Claims, 3 Drawing Figures

ARM WITH ADJUSTABLE SWIVEL CONNECTION

BACKGROUND AND BRIEF DESCRIPTION OF THE INVENTION

This invention relates to a device for clamping a support assembly, adjustably holding an arm in the support assembly and adjustably holding a table or other device by a swivel connection at the outer end of the arm.

It is known that an arm member may be held at an angle in a support assembly and that the support assembly may be clamped to a desk or other furniture. A small table may be positioned at the outer end of the arm and its angle may be adjusted relative to the arm.

In addition, there are various types of swivel connections shown in the patent literature. In U.S. Pat. No. 2,506,884 entitled "Camera Stand For Medical Photography" a swivel ball having a screw threaded post has a bore perpendicular to the post. A bolt passes through the bore and through opposite side supports to adjustably hold the ball. In U.S. Pat. No. 3,198,408 entitled "Support For A Manikin Form" a swivel ball is held between a fixed ring seat and a movable ring seat, the moveable ring seat being mounted on a screw operated plunger. Similarly in U.S. Pat. No. 3,211,405 a swivel ball is held between fixed and moveable rings, but the moveable ring is progressed by a cam device.

One problem with these prior swivel arrangements is that they require relatively heavy and expensive machined parts.

The present invention overcomes this difficulty by providing a swivel connection which uses relatively light weight and inexpensive sheet metal parts. Since the swivel connection is relatively light in weight, it may be mounted at the end of an arm, without requiring a heavy arm or a specially strong arm support assembly.

In accordance with the present invention, an arm member comprises, at its outer end, a U-shaped channel having a base and opposite extending side wall arms. A hole in the base forms a round rim. A ball protrudes through the rim and a post (boss) extends from the ball. The post is screw-threaded so that a small table or other device, such as a lamp, may be mounted thereon. A lever means within the channel applies pressure to the ball to retain it in position. The lever means is a sheet metal member one end of which is fixed to the channel member. The lever member has a round opening with a rim which bears against the ball.

An adjustment means extends from the arm member. Preferably, the adjustment means is a knob fixed to a threaded shaft. It is connected to the lever means and adjustably applies pressure to the ball, so that the ball may turn when the adjustment means is loosened and prevented from turning when it is tightened.

The present invention is particularly advantageous in supporting visual display units for computers. The swivel connection permits ready adjustment to each individual user's requirement.

The following detailed description describes a representative and presently preferred embodiment of the invention.

DETAILED DESCRIPTION

Figure 1:
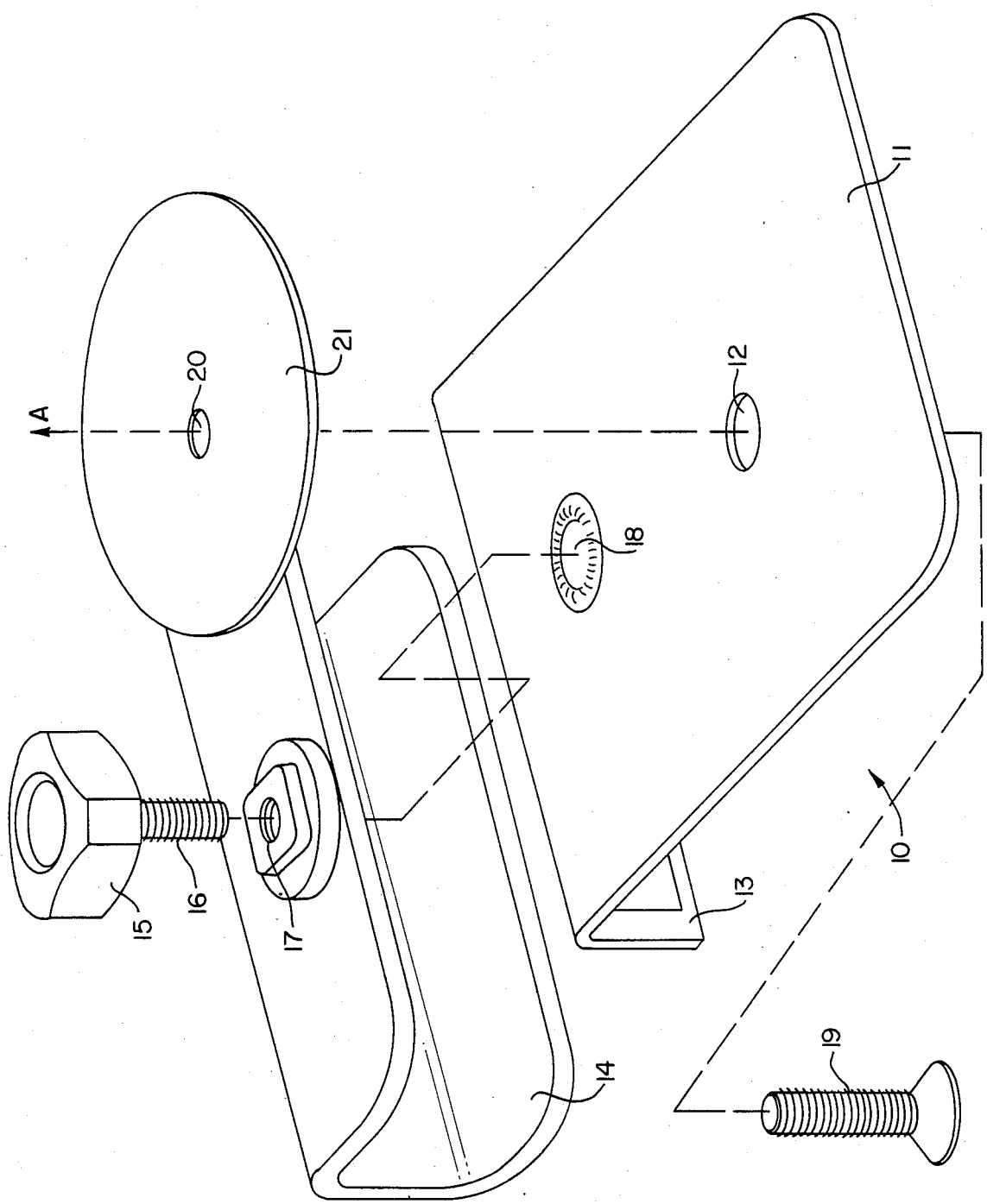
FIG. 1 is a perspective and exploded view showing the clamping mechanism.
Figure 2:
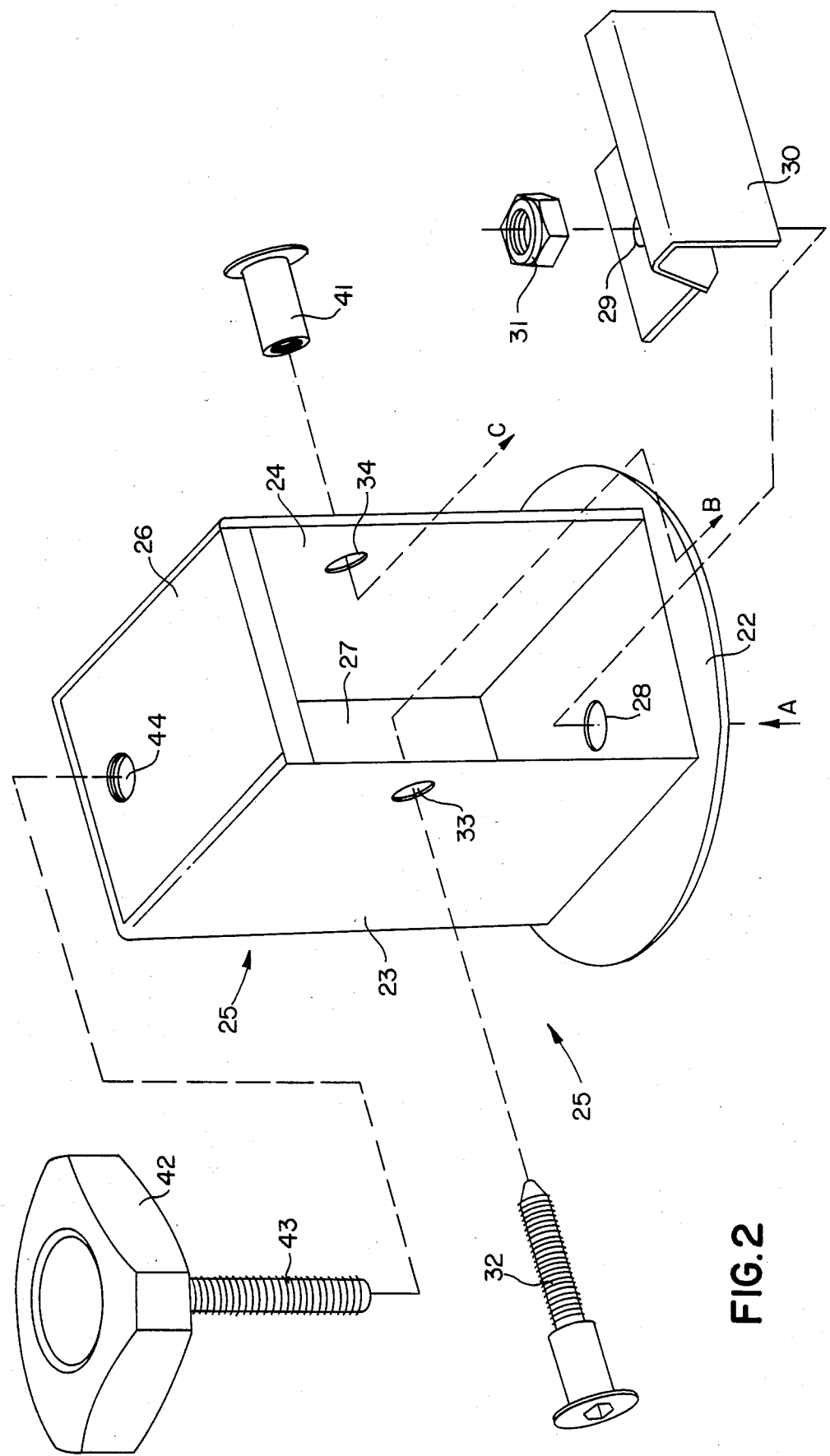
FIG. 2 is a perspective and exploded view showing the support assembly.
Figure 3:
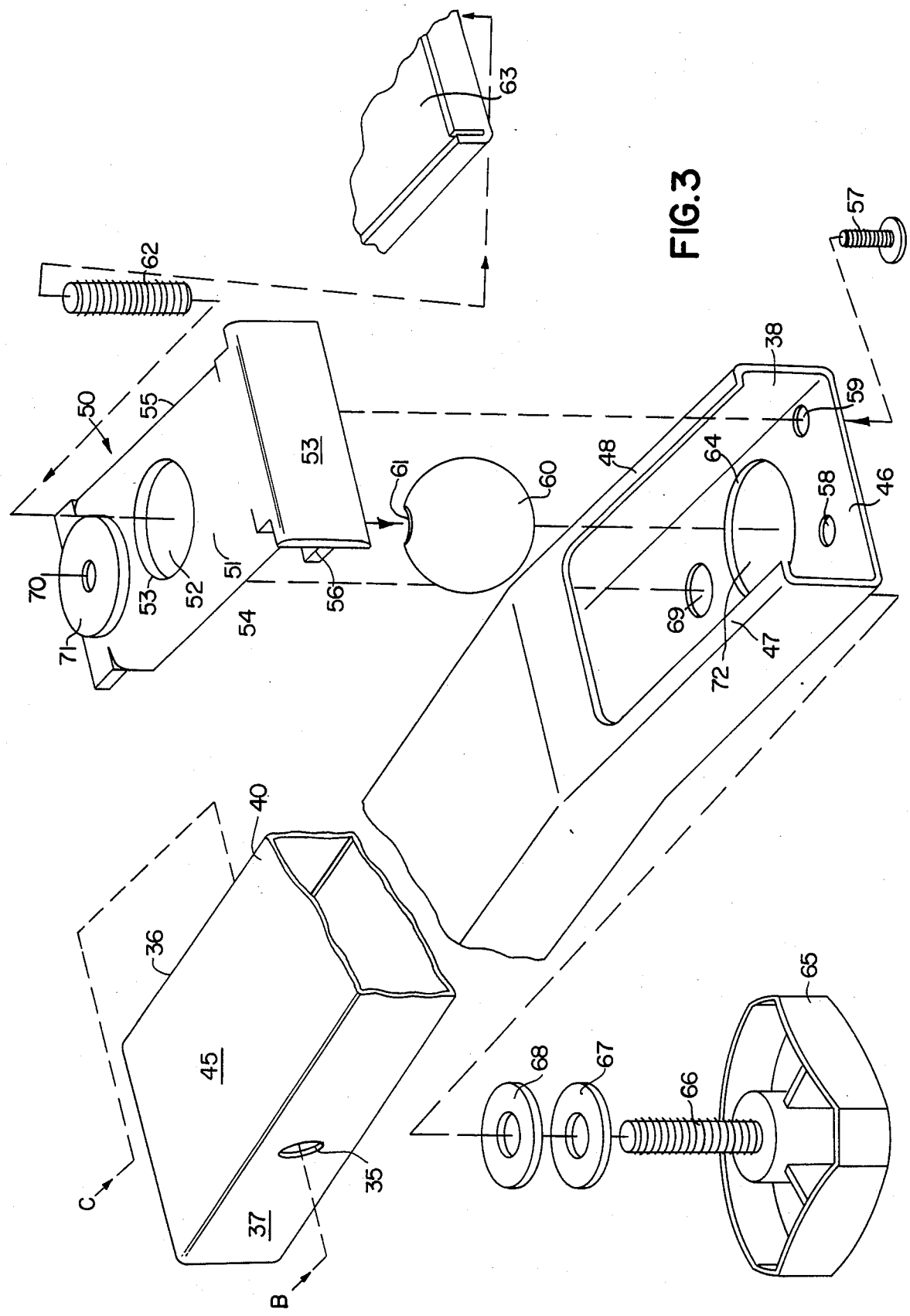
FIG. 3 is a perspective and exploded view showing the arm member and the swivel connection.

Referring to FIG. 1 the clamp assembly 10 is adapted to be connected to the support assembly 25 shown in FIG. 2. The clamp assembly 10 includes a clamp plate 11 having a hole 12 therethrough and a flange portion 13.

The flange portion 13 fits in the side facing U-shaped channel member 14. A knob 15 has a screw-threaded shaft 16 which screws into screw hole 17 through the top of channel member 14 and bears against the solid round portion 18 on the top face of the plate 11.

A bolt 19 extends through hole 12 of plate 11 and through hole 20 of disk 21. The disk 21 fits under the disk portion 22 of the support assembly 25. The support assembly 25 also includes the opposite side wall members 23, 24, the top member 26, and the rear wall member 27. The bolt 19 extends through hole 28 in the disk portion 22, through hole 29 in bracket 30 and is retained by the nut 31.

A bolt 32 fits through the holes 33, 34 on the side walls 23, 24 respectively, and also through the holes 35, 36 (hole 36 not shown) in the side walls 37, 38 of the arm member 40. The bolt 32 screws into the sleeve-nut 41. The cylindrical outer walls of the bolt 32 and sleeve-nut 41 are smooth and act as the bearing surfaces i.e. a pin, for the arm member holes 35, 36.

A knob 42 having a screw threaded shaft 43 extending therefrom is screwed through screw hole 44 on the top member 26. The end of the shaft 43 bears against the top wall 45 of the arm member 40. When the knob 42 is turned to bring its shaft 43 downwardly the end of the shaft 43 bears on the top wall 45 and pivots the outer end of the arm member upwardly. The angle of the arm member 40 relative to the support assembly 25, is adjusted by turning the knob 42.

The arm member 40, is formed from sheet metal and, at its outer end, is a U-shaped member having a bottom wall 46 and side walls 37, 38. The top wall 45 does not extend to the outer end of the arm member 40. Instead, at the outer end, the side walls 37, 38 are bent over to form flanges 47, 48, respectively.

The lever means 50 is formed of sheet metal and secured in the arm member at its outer end. It comprises a top plate 51 having a hole 52 forming a circular rim and having curved-over sides 54, 55 an end plate 53 which closes the open end of the arm member 40, and a bottom flange portion 56. A pair of screws 57 (only one of which is shown) extends through holes 58, 59 in bottom wall 46 and are screwed into the flange portion 56, to fix the flange portion 56 to the bottom wall 46 and thereby retain the lever means in the arm member.

A ball 60 (swivel ball) has a screw threaded bore 61. A screw threaded post 62 (shaft) is screwed into the bore 61 to form a boss extending from the ball 60. The small table 63, or other device, is connected to the post 62, for example by a nut and bracket.

The ball 60 fits within, and protrudes through the rim 64 of hole 72 in bottom wall 46 and the rim 53. A large knob 65 has extending screw threaded shaft 66. The shaft 66 extends freely through washers 67, 68 and the hole 69 in bottom wall 46. The shaft 66 is screwed into the screw hole 70 formed through the lever top plate 51 and its attached disk 71.

In operation, the angle of the arm member 40 relative to the support assembly 25 is adjusted by turning the knob 42. When the knob 42 is rotated clockwise, it pushes on the top wall 45 at the inner end of the arm member 40 and raises the outer end of the arm member. That adjustment mechanism is used to raise or lower the table 63, or other device which is removably attached at the end of the arm member 40.

The table 63, or other device, may be adjusted as to its angle relative to the arm member 40, by the swivel connection. To readjust the angle of the table, the knob 65 is turned counter-clockwise which lifts the free end of the lever means by lifting the disk 71. The pressure on the ball 60 from rim 53 is lessened and the ball is free to turn. After the adjustment is made, the ball is retained in its new position by rotating knob 65 clockwise, tightening the rim 53 on the ball 60.

What is claimed is:

1. An adjustable arm member swivel connection comprising:

an arm member comprising at one end thereof a U-shaped channel having a base plate and opposite extending side walls and having in said base plate a round opening forming a round rim;

a ball protruding through and retained by said arm member rim, a post fixed to said ball and extending therefrom;

lever means having opposite ends positioned within said channel to apply pressure to said ball, said lever means being a sheet metal member having a round opening forming a rim which bears against said ball;

adjustment means extending from said arm member and adjustably connected to the lever means on the opposite side of said lever means rim from said lever fixing means, said adjustment means adjustably applying pressure to said ball from said lever fixture rim and against said arm member rim, so that the ball may turn when the adjustment means is loosed and the ball is prevented from turning when the adjustment means is tightened.

2. A swivel connection as in claim 1 wherein one end of said channel is open and said lever means has an end plate which is vertical to said channel base and closes the open end of said channel.

3. A swivel connection as in claim 2 wherein said lever means comprises as portions of a unitary sheet metal member; said end plate, a bottom flange perpendicular to said end plate and fixed to said channel base plate, and a top plate perpendicular to said end plate and having said lever means opening therein.

4. A swivel connection as in claim 1 wherein said channel arms have inwardly directed flanges to retain said lever means.

5. A swivel connection as in claim 1 wherein said ball has screw-threaded hole therein, said post is a screw-threaded shaft and part of said shaft is screwed into said ball hole.

6. A swivel connection as in claim 1 and further including a table having means adapted to be removably attached to said post.

7. A swivel connection as in claim 1 wherein said arm member has a top wall member opposite to and parallel said base plate and connected at the ends of said side walls, the top plate member extending to said lever means.

8. A swivel connection as in claim 1 wherein said adjustment means comprises a knob, a screw-threaded shaft extending from said knob and connected thereto, a hole in said channel base plate through which the knob shaft protrudes and freely rotates therein, and screw-threaded nut means fixed on said lever means to receive said knob shaft.

9. An arm assembly including a swivel connection comprising:

an elongated arm member having a top plate member and side walls connected thereto at opposite sides thereof; said arm member having inner and outer ends;

an adjustable support means to adjustably support said arm member near said inner end, said support means comprising a box-like support having a base plate, side walls and a top plate, pivot means to pivotally connect the arm member side walls to the support side walls, a knob having a threaded shaft extending therefrom, and a threaded hole in said support top plate through which said knob shaft is threaded, the end of said knob shaft bearing against the top plate of the arm between its inner end and its support pivot, said arm member comprising at said outer end thereof a U-shaped channel having a base plate and said side walls and having in said base plate a round opening with a round rim;

a ball protruding and retained by said base plate rim, a post fixed to said ball and protruding therefrom;

a lever means having opposite ends positioned within said channel to apply pressure to said ball, said lever means having a round opening with a rim which bears against said ball and lever fixing means fixing one end of said lever means to said channel;

swivel adjustment means protruding from said arm member and adjustably connected to the lever means on the opposite side of said lever means rim from said lever fixing means, said adjustment means adjustably applying pressure to said ball from said lever fixture rim and against said arm member, so that the ball may turn when the adjustment means is loosed and the ball is prevented from turning when the adjustment means is tightened.

10. An arm assembly as in claim 9 and further including clamp means fixed to said support base to removably clamp said support base to a table; said clamp means including a U-shaped member which is adapted to fit over the edge of a table and having a hole therethrough and a knob having a screw threaded shaft, which shaft fits through said U-shaped member hole.

11. An arm assembly as in claim 9 wherein said pivot means comprises holes in said arm member side walls and support side walls and a pin through said side wall holes.

12. An arm assembly as in claim 9 wherein the outer end of said arm member is open and said lever means has an end plate which is vertical to said base plate and closes the open end of said arm member.

13. An arm assembly as in claim 12 wherein said lever means comprises said end plate, a bottom flange perpendicular to said end plate and fixed to said base plate, and a top plate perpendicular to said end plate and having said lever means opening therein.

14. An arm assembly as in claim 9 wherein said side walls near said outer end have inwardly directed flanges to retain said lever means.

15. An arm assembly as in claim 9 wherein said ball has a screw-threaded hole therein, said post is a screw-threaded shaft and part of said shaft is screwed into said ball hole.

16. An arm assembly as in claim 9 and further including a table having means adapted to be removably attached to said post.

17. An arm assembly as in claim 9 wherein said swivel adjustment means comprises a knob, a screw-threaded shaft extending from said knob and connected thereto, a hole insaid channel base plate through which the knob shaft protrudes and freely rotates therein, and screw-threaded nut means fixed on said lever means to receive said knob shaft.

* * * * *